(12) United States Patent
Koguchi

(10) Patent No.: US 7,400,656 B2
(45) Date of Patent: Jul. 15, 2008

(54) TIME STAMP CORRECTION APPARATUS AND TIME STAMP CORRECTION SYSTEM

(75) Inventor: Hiroshi Koguchi, Kanagawa (JP)

(73) Assignee: Kabushiki Kaisha Toshiba (JP)

( * ) Notice: Subject to any disclaimer, the term of this patent is extended or adjusted under 35 U.S.C. 154(b) by 693 days.

(21) Appl. No.: 11/089,850

(22) Filed: Mar. 25, 2005

(65) Prior Publication Data

US 2005/0265334 A1     Dec. 1, 2005

(30) Foreign Application Priority Data

Mar. 29, 2004     (JP)     ............... 2004-096194

(51) Int. Cl.
 *H04J 3/06*     (2006.01)
(52) U.S. Cl. .................................. 370/516
(58) Field of Classification Search ........ 370/252, 370/253, 280, 294, 321, 330, 345, 350, 369, 370/372, 376, 395.4, 395.62, 436, 458, 468, 370/503, 508, 509, 510, 511, 512, 513, 514, 370/516, 517, 518, 519, 520, 521
See application file for complete search history.

(56) References Cited

U.S. PATENT DOCUMENTS 6,661,811 B1 * 12/2003 Baker ................. 370/516

2002/0141431 A1 * 10/2002 Tripathy ................. 370/428

FOREIGN PATENT DOCUMENTS

JP     2005-284600 A  *  10/2005

* cited by examiner

*Primary Examiner*—Chirag G Shah
*Assistant Examiner*—Ashley L Shivers
(74) *Attorney, Agent, or Firm*—DLA Piper US LLP

(57) ABSTRACT

There is provided a time stamp correction apparatus for being used in an apparatus which receives a packet including real time data and a time stamp based on network time from a network and reproduces the real time data on the basis of the time stamp, the time stamp correction apparatus including: receiving a first packet including the real time data and a first time stamp; successively generating the network time according to synchronous information input from the network; calculating a difference between time by the first time stamp and the network time; successively generating local time; generating a second time stamp based on the difference and the local time; generating a second packet by adding the second time stamp to the real time data; storing the generated second packet into a buffer unit; and conducting output control on the second packet on the basis of the local time.

19 Claims, 9 Drawing Sheets

TIME STAMP CORRECTION APPARATUS AND TIME STAMP CORRECTION SYSTEM

CROSS-REFERENCE TO RELATED APPLICATIONS

This application claims the benefit of priority under 35USC § 119 to Japanese Patent Application No. 2004-96194 filed on Mar. 29, 2004, the entire contents of which are incorporated herein by reference.

BACKGROUND OF THE INVENTION

1. Field of the Invention

The present invention relates to a time stamp correction apparatus and a time stamp correction system.

2. Related Background Art

In some cases, devices connected to a network share time information (network time). If there are a plurality of networks, unique network time is administered to every network.

A device transmitting real time data (transmitting device) generates information of time (time stamp) for the real time data to be reproduced in a receiving device, on the basis of network time in a network to which the transmitting device belongs itself. This time stamp is calculated by adding an offset value to the network time. The transmitting device transmits the generated time stamp to the receiving device together with the real time data as a real time packet.

After receiving the real time packet, the receiving device processes real time data synchronized with the network time, on the basis of the time stamp contained in the real time packet. The receiving device temporarily retains the received real time packet in an internal storage device (FIFO (First In First Out)) until data processing is started.

The network (first network) to which the above-described transmitting device and receiving device belong is connected to (integrated with) a different network (second network) in some cases. Network time in the network after integration is unified into the network time of either the first network or the second network. If the network time after integration is made equal to the network time of the second network, discontinuity occurs in the network time of the first network including the above-described transmitting device and receiving device.

If in this case a real time packet is already retained in the FIFO in the receiving device at the time of the network integration, a time stamp in this real time packet is based on the old network time before the integration. This results in a problem that the receiving device cannot continue data processing while maintaining real time quality.

SUMMARY OF THE INVENTION

According to an aspect of the present invention, there is provided a time stamp correction apparatus which receives a packet including real time data and a time stamp, which is based on network time and to be added to the real time data from a network, and reproduces the real time data in the received packet on the basis of the time stamp, the time stamp correction apparatus comprising: a packet receiving unit which receives a first packet including the real time data and a first time stamp based on the network time from the network; a network time counter which successively generates the network time in accordance with network time synchronous information input from the network; a difference calculating unit supplied with the first time stamp included in the received first packet to calculate a difference between time indicated by the first time stamp and the network time; a local time counter which successively generates local time; a time stamp generating unit which generates a second time stamp on the basis of the difference and the local time; a packet generating unit which generates a second packet by adding the second time stamp to the real time data; a buffer unit which stores the generated second packet; and an output control unit which conducts output control on the second packet in the buffer unit on the basis of the local time.

According to an aspect of the present invention, there is provided a time stamp correction system for being used in an apparatus which receives a packet including real time data and a time stamp, which is based on network time and to be added to the real time data from a network, and reproduces the real time data in the received packet on the basis of the time stamp, the time stamp correction system comprising: a time stamp correction apparatus comprising a packet receiving unit which receives a first packet including the real time data and a first time stamp based on the network time from the network, a network time counter which successively generates the network time in accordance with network time synchronous information input from the network, a local time counter which successively generates local time, and a difference requesting unit which requests calculation of a difference between the first time stamp in the first packet and the network time; and a CPU connected to an identical bus with the time correction apparatus to execute the difference calculation requested by the time stamp correction apparatus and output an execution result, wherein the time stamp correction apparatus further comprises: a time stamp generating unit which receives the execution result from the CPU and generates a second time stamp on the basis of the received execution result and the local time; a packet generating unit which generates a second packet by adding the second time stamp to the real time data; a buffer unit which stores the generated second packet; and an output control unit which conducts output control on the second packet in the buffer unit on the basis of the local time.

According to an aspect of the present invention, there is provided a time stamp correction system for being used in an apparatus which receives a packet including real time data and a time stamp, which is based on network time and to be added to the real time data from a network, and reproduces the real time data in the received packet on the basis of the time stamp, the time stamp correction system comprising: a time stamp correction apparatus comprising a packet receiving unit which receives a first packet including the real time data and a first time stamp based on the network time from the network, a network time counter which successively generates the network time in accordance with network time synchronous information input from the network, a local time counter which successively generates local time, a difference calculating unit supplied with the first time stamp included in the first packet to calculate a difference between the first time stamp and the network time, and a time stamp generation requesting unit which requests generation of a second time stamp based on the difference and the local time; and a CPU connected to an identical bus with the time correction apparatus to generate the second time stamp with accordance with the request from the time stamp correction apparatus, and output the generated time stamp, wherein the time stamp correction apparatus further comprises: a packet generating unit which receives the second time stamp and generates a second packet by adding the real time data to the second time stamp; a buffer unit which stores the generated second packet;

and an output control unit which conducts output control on the second packet in the buffer unit on the basis of the local time.

DETAILED DESCRIPTION OF THE INVENTION

Figure 1:
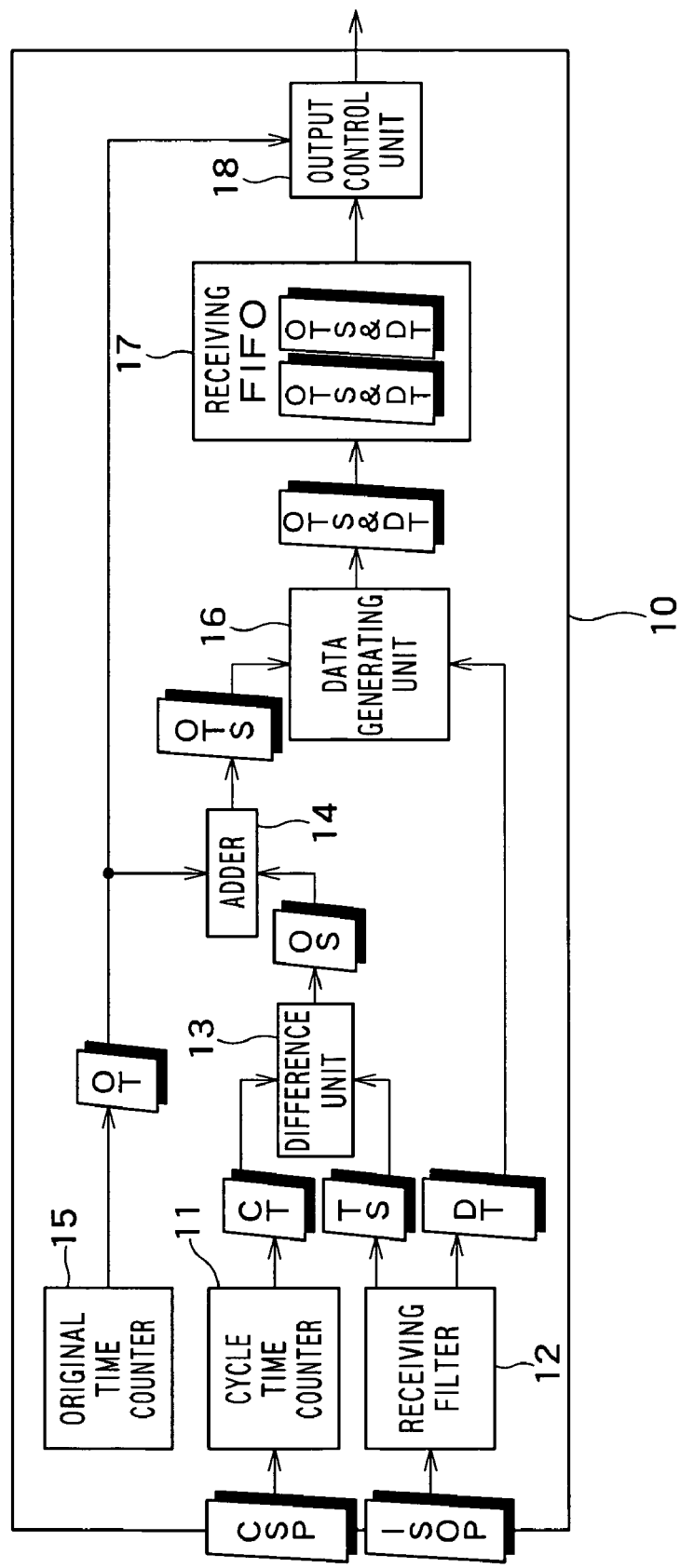
FIG. 1 is a block diagram showing a configuration of a time stamp correction apparatus according to an embodiment of the present invention.

FIG. 1 is a block diagram showing a configuration of a receiving device (time stamp correction apparatus) 10 according to an embodiment of the present invention. This receiving device 10 is used in, for example, an apparatus having an IEEE 1394 serial interface. The receiving device 10 executes the so-called isochronous data transfer with another device connected to an IEEE 1394 network. Hereafter, the receiving device 10 will be described in detail.

As shown in FIG. 1, a cycle time counter 11 successively generates and outputs a cycle time CT (network time). The cycle time counter 11 generates the cycle time (network time) on the basis of a cycle start packet CSP (network time synchronous information) received from the network.

This cycle start packet CSP is generated by a cycle master (see FIG. 4A) connected to the same network. The cycle master notifies respective devices of the generated cycle start packet CSP periodically (for example, at intervals of 125 μs). As the cycle master, for example, a route node of a device connected to the network is selected.

A receiving filter 12 receives a real time packet ISOP sent from the transmitting device (not illustrated), via the network.

Figure 2B:
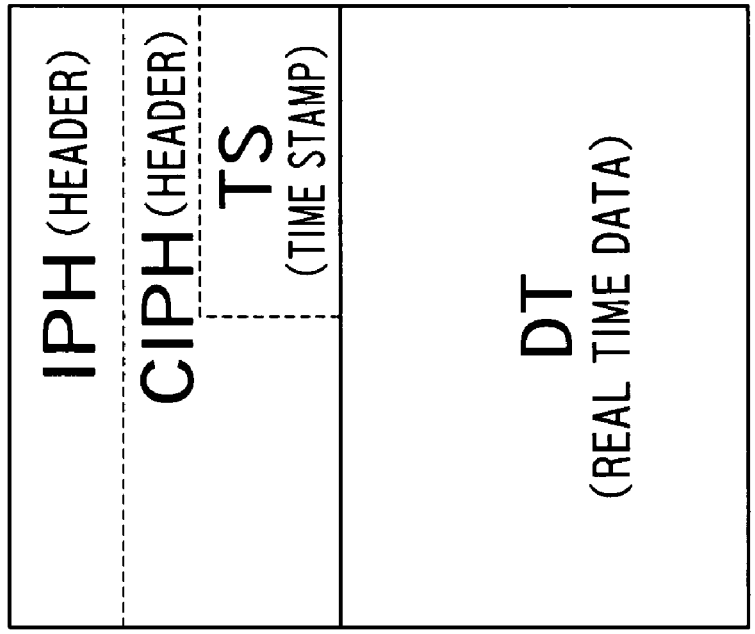
FIGS. 2A and 2B are diagrams schematically showing structure examples of a real time packet.
Figure 2A:
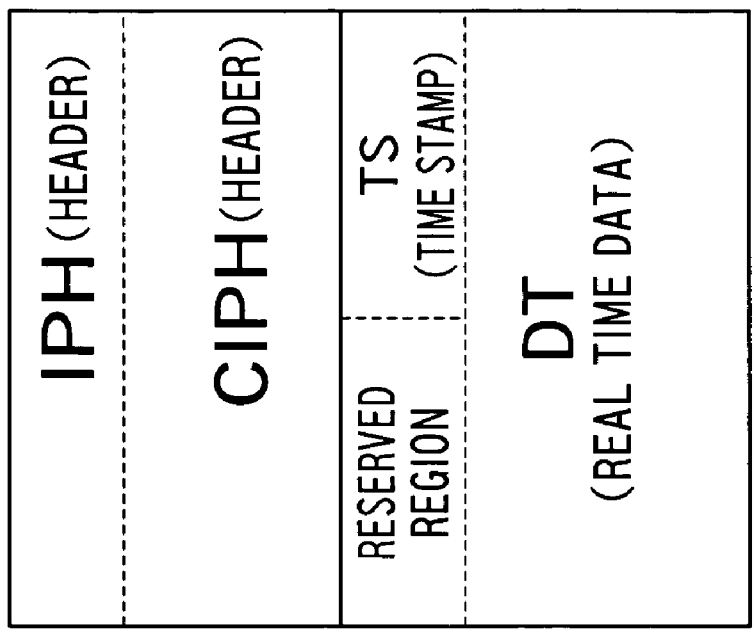

FIGS. 2A and 2B are diagrams schematically showing structure examples of the real time packet ISOP.

Either of the structures includes two headers IPH and CIPH, a time stamp TS, and real time data DT. The real time data DT is, for example, multimedia data such as image data or sound data. A packet structure shown in FIG. 2A further includes a reserved region.

Referring back to FIG. 1, the receiving filter 12 removes the headers IPH and CIPH from the real time packet ISOP, separates the packet resulting from the removal into the real time data DT and the time stamp TS, and outputs them (in the case of the packet structure shown in FIG. 2B). (In the case of the packet structure shown in FIG. 2A, the receiving filter 12 separates the packet resulting from the removal into the real time data DT with the reserved region and the time stamp TS, and outputs them. The following description is premised on the packet structure shown in FIG. 2B.)

A difference unit 13 successively receives the cycle time CT from the cycle time counter 11. Furthermore, the difference unit 13 receives the time stamp from the receiving filter 12. Upon receiving the time stamp TS, the difference unit 13 calculates a difference (magnitude of difference) between the time stamp TS and the cycle time CT at that time, such as, for example, "time stamp TS—cycle time CT." In other words, the difference unit 13 calculates a time interval between the current network time and the time when to output the real time data DT from a receiving FIFO 17 described later. The difference unit 13 outputs the calculated difference to an adder 14 as an offset OS.

The adder 14 successively receives an original time (internal time) OT from an original time counter 15. The original time (internal time) OT corresponds to, for example, local time. The original time counter 15 counts individual original time (internal time) OT independently of the network time.

In other words, the cycle time counter 11 counts the network time based on the cycle start packet CSP. For example, if a network to which the cycle time counter 11 belongs is connected to a different network and consequently its own network time is united to the network time of the different network, the cycle time counter 11 starts to count a new network time on the way. In other words, the cycle time counter 11 starts the network time that is discontinuous with the original network time. On the other hand, the original time counter 15 counts the original time (internal time) unique to only the present apparatus. Unless reset (for example, unless the counter reaches its maximum), therefore, the original time (internal time) does not become discontinuous.

Upon receiving the offset OS from the difference unit 13, the adder 14 adds the offset OS and the original time OT at this time and thereby generates a new time stamp (original time stamp OTS). The original time stamp OTS indicates a time interval between the current internal time and the time when the real time data DT is output from the receiving FIFO 17 described later. If the original time stamp 15 counts down the original time OT as represented by, for example, 10, 9, 8 . . . , the adder 14 subtracts the offset OS from the original time OT to generate the original time stamp OTS.

Figure 3B:
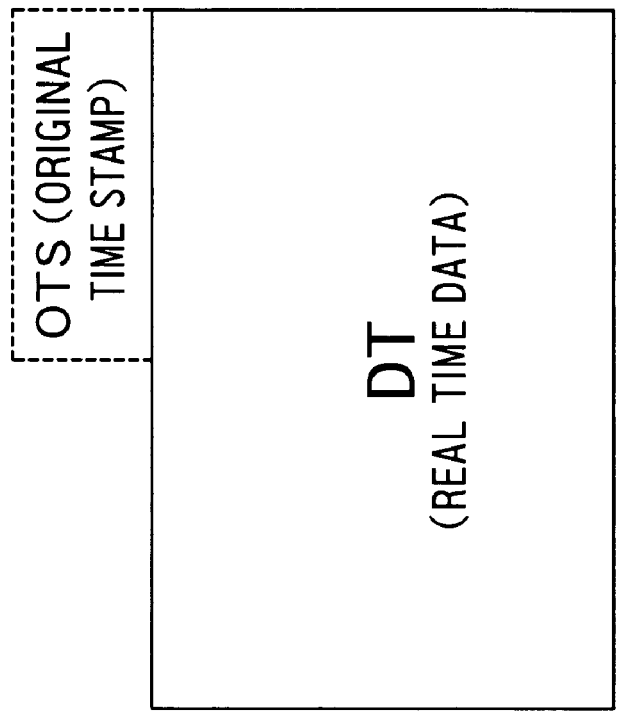
FIGS. 3A and 3B are diagrams schematically showing structure examples of a packet including an original time stamp.
Figure 3A:
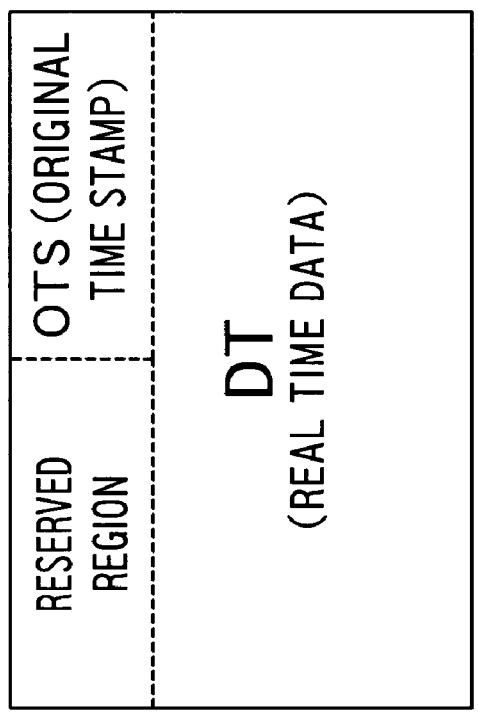

A data generating unit 16 receives real time data DT from the receiving filter 12. On the other hand, the data generating unit 16 receives the original time stamp OTS from the adder 14. The data generating unit 16 adds the original time stamp OTS to the real time data DT, thereby generates a new packet OTS&DT, and inputs the packet OTS&DT to the receiving FIFO 17. The receiving FIFO 17 successively stores the input packet OTS&DT. Generated packets OTS&DT are shown in FIGS. 3A and 3B so as to be respectively associated with the structures shown in FIGS. 2A and 2B.

An output control unit 18 successively receives the original time OT from the original time counter 15, and compares the received original time OT with the original time stamp OTS in a head packet OTS&DT in the receiving FIFO 17. If the original time stamp OTS reaches the original time OT, the output control unit 18 removes the original time stamp OTS from the packet OTS&DT. (In the case of the packet structure shown in FIG. 2A, reserved region data is further removed.) Thereafter, the output control unit 18 outputs the real time data DT to a subsequent stage (for example, a data reproducing unit which is not illustrated).

Effects obtained in the present embodiment will now be described.

Figure 4A:
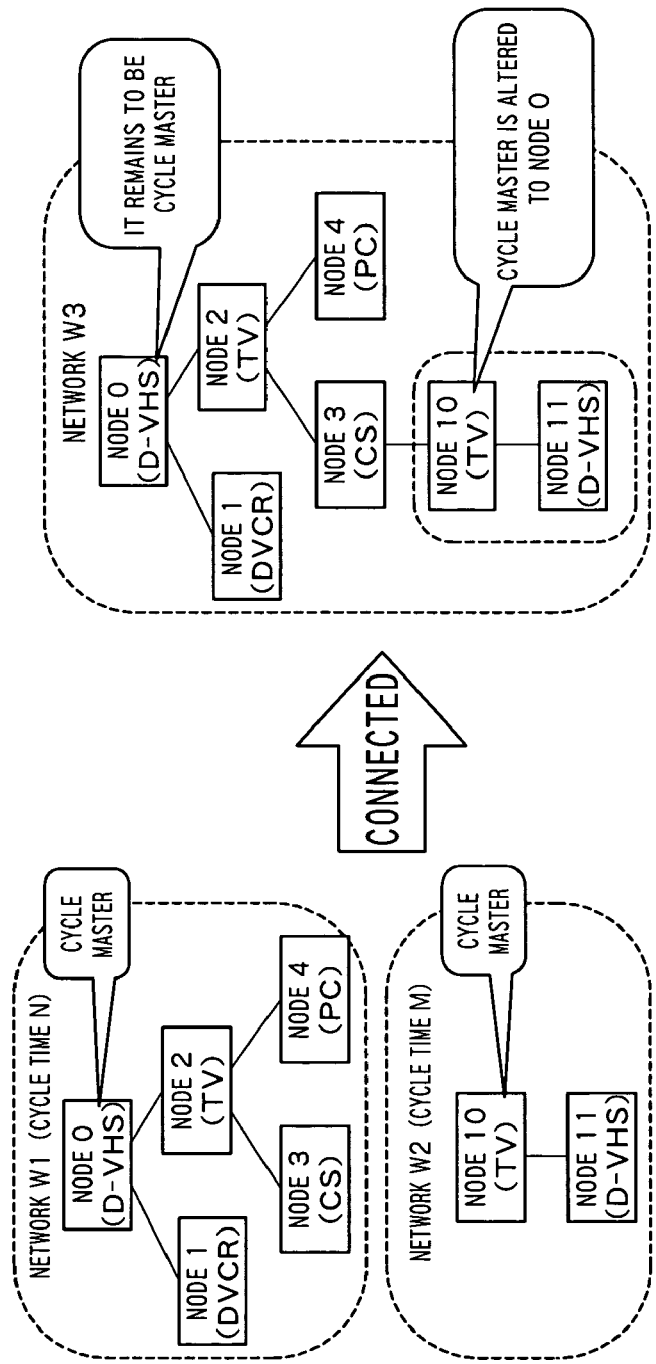
FIGS. 4A and 4B are diagrams showing a problem caused when networks respectively having different cycle times (network times) are connected to each other.
Figure 4B:
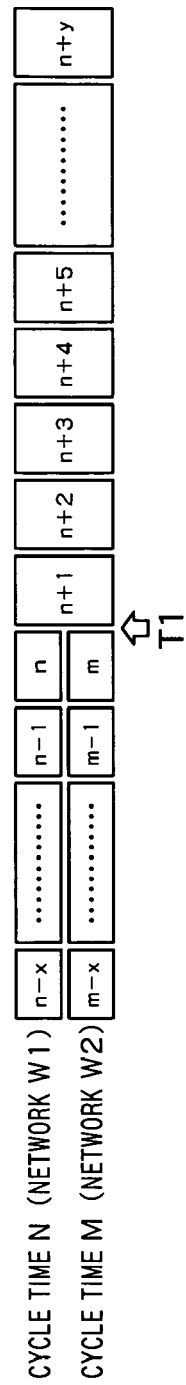

FIGS. 4A and 4B are diagrams showing a problem caused when networks W1 and W2 respectively having different cycle times (network times) are connected to each other. Each of nodes 0 to 4, 10 and 11 in the networks W1 and W2 includes a receiving device 109 (see FIG. 5A) described later that has been implemented before the present inventor achieves the present invention.

As shown in FIG. 4A, the network W1 has a cycle time N, and the network W2 has a cycle time M. Nodes 0 and 10 in the networks W1 and W2 are cycle masters. Each of the cycle masters 0 and 10 periodically notifies nodes connected to its own network of the cycle time.

It is now supposed that the networks W1 and W2 are connected to each other at time T1 to form a network W3. If the network configuration is changed, selection of the cycle master is newly conducted. It is now supposed that the node 0 is selected as a cycle master of the network W3. Therefore, the node 0 notifies the nodes 0 to 4, and 10 to 11 connected to the network W3 of a cycle time that is continuous with that in the network W1. Therefore, the nodes 10 to 11 which belonged to the network W2 receive a cycle time that is discontinuous with the original cycle time.

In other words, nodes that were connected to the network W1 have continuous cycle times even after the network integration. In the nodes 10 and 11 which were connected to the network W2, however, discontinuity occurs in the cycle time at time T1. For example, supposing that n=10 and m=90 in FIG. 4B, the cycle time proceeds continuously as represented by "10-X, . . . 9, 10, 11, 12 . . . " in the nodes that were connected to the network W1, whereas discontinuity occurs in the middle of the cycle time as represented by "90-X, . . . 89, 90, 11, 12 . . . " in the nodes that were connected to the network W2.

If discontinuity thus occurs in the cycle time, it becomes impossible to conduct processing on packets that were already stored in the receiving FIFO at the time of integration, while maintaining real time quality. Hereafter, this will be described in more detail.

Figures 5A, 5B:
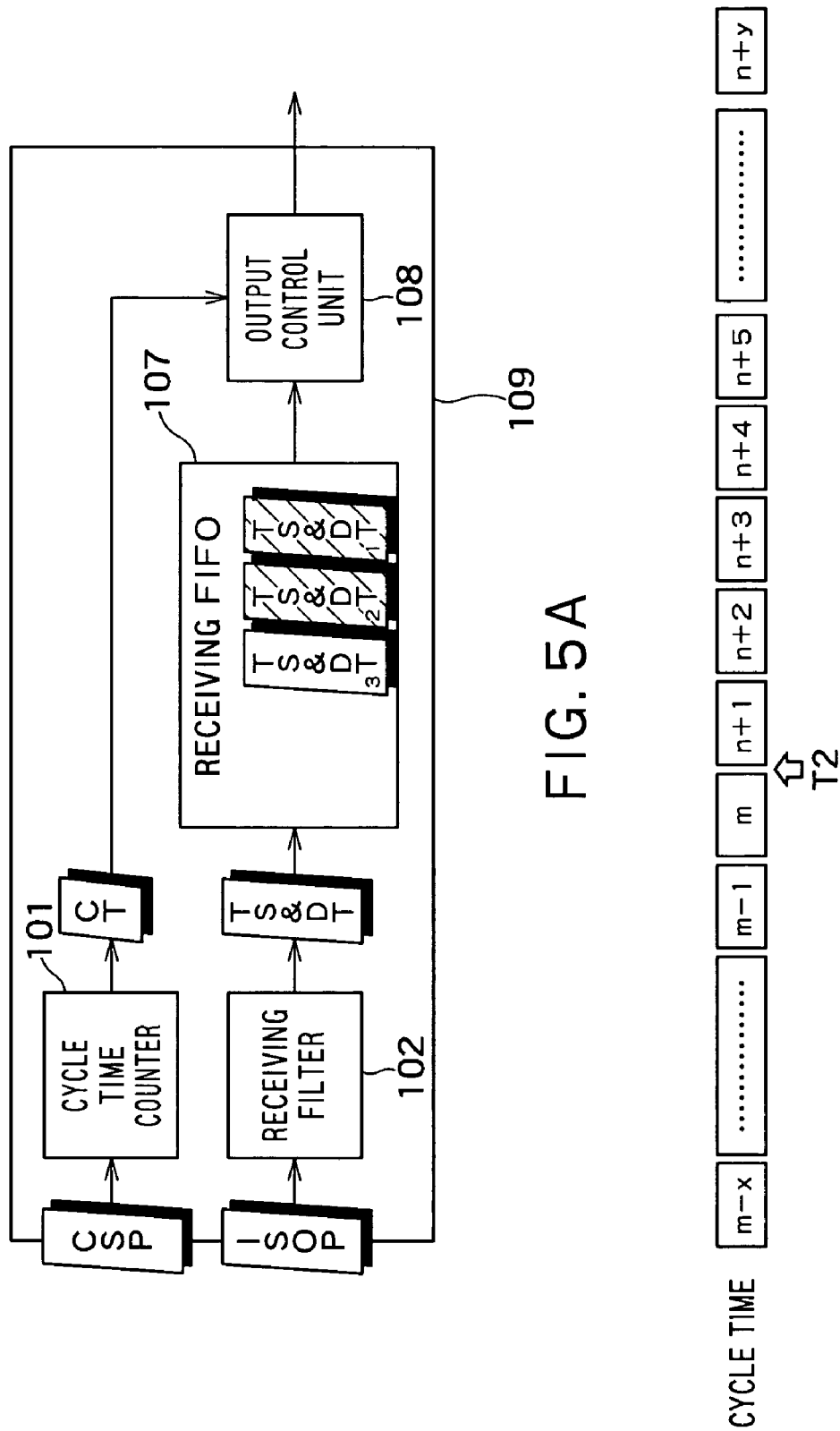
FIG. 5A is a block diagram showing a configuration of a receiving device that has been implemented before the present inventor achieves the present invention.
FIG. 5B is a diagram showing how discontinuity occurs in network time.

FIG. 5A is a diagram showing a configuration of the receiving device 109 that has been implemented before the present inventor achieves the present invention.

Packets TS&DT1 and TS&DT2 each with a time stamp added are stored in a receiving FIFO 107. It is supposed that in this state a cycle time counter 101 receives a new cycle start packet CSP at time T2 (see FIG. 5B) and starts counting new cycle times. In other words, it is supposed that discontinuity has occurred in the cycle time at time T2. In this case, it becomes impossible for an output control unit 108 to conduct processing on the packets TS&DT1 and TS&DT2 in the receiving FIFO 107 while maintaining real time quality.

For example, it is now supposed that the packets TS&DT1 and TS&DT2 have time stamps "10" and "11," respectively, and the cycle time proceeds as represented by "1, 2, 3 . . . " If at this time the cycle time is altered on the way and becomes "1, 2, 3, 100, 101 . . . ," the cycle times "10" and "11" are skipped, and consequently the packets TS&DT1 and TS&DT2 are not subjected to proper processing. Furthermore, as a result, a packet TS&DT3 stored in the receiving FIFO 107 after the alteration of the cycle time shown in FIG. 5A is not subjected to proper processing, either, because the processing of the preceding packet is not finished.

On the other hand, such a problem does not occur in the present embodiment.

Figure 6:
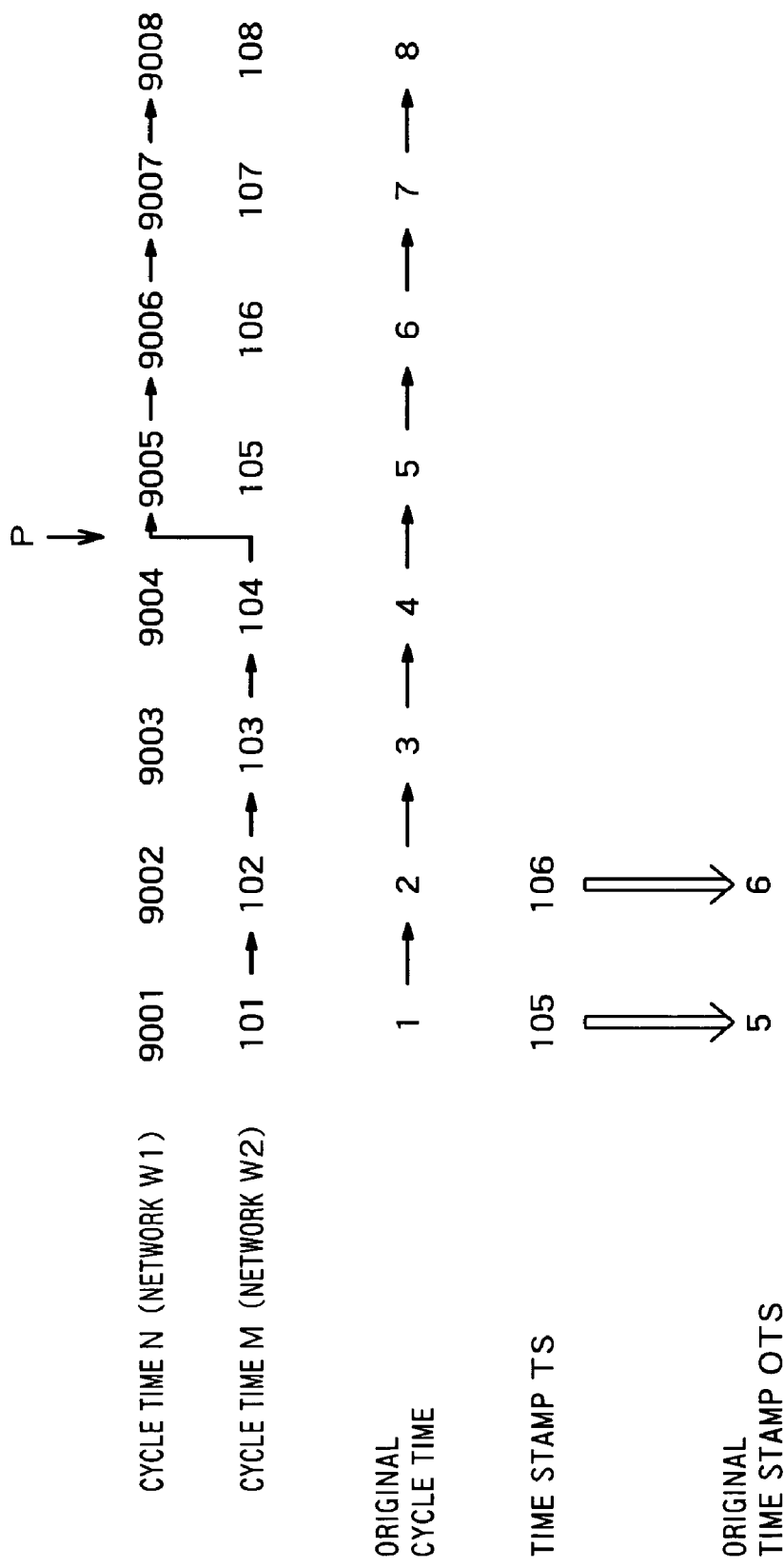
FIG. 6 is a diagram showing an effect obtained according to the present embodiment.

FIG. 6 is a diagram showing an effect obtained according to the present embodiment.

It is now supposed that the receiving device 10 shown in FIG. 1 is connected to the network W2 of the cycle time M as shown in FIG. 6. It is further supposed that this network W2 is connected to the network W1 of the cycle time N at illustrated time P and discontinuity has occurred in the cycle time. In other words, it is supposed that the cycle time (network time) of the receiving device 10 proceeds as represented by "101, 102, 103, 104, 9005, 9006, 9007, 9008 . . . "

On the other hand, it is supposed that the original cycle time (internal time) in the receiving device 10 proceeds as represented by "1, 2, 3, 4, 5, 6, 7, 8 . . . "

It is supposed that a packet with a time stamp [105] is received by the receiving device 10 at cycle time 101, and subsequently a packet with a time stamp [106] is received by the receiving device 10 at cycle time 102 as shown in FIG. 6.

In the conventional art, cycle time proceeds as represented by "101, 102, 103, 104, 9005, 9006, 9007, 9008 . . . " as described above. Therefore, the packets with the time stamp [105] or [106] are not subjected to proper processing.

On the other hand, in the present embodiment, the time stamp [105] is altered to an original time stamp [5] (=(105−101)+1), and the time stamp [106] is altered to an original time stamp [6] (=(106−102)+2). And the original cycle time proceeds as represented by "1, 2, 3, 4, 5, 6, 7, 8 . . . " as described above. Therefore, the packets with the original time stamp [5] and [6] added are subjected to proper processing at the original cycle time [5] and [6].

As described above, according to the present embodiment, the difference between the time stamp and the network time is calculated and the difference is added to the internal time to generate the original time stamp. By controlling outputting of packets with the original time stamp on the basis of the internal time, therefore, the processing can be continued while maintaining real time quality even if discontinuity occurs in the network time.

In the above-described embodiment, the calculation of the difference between the time stamp TS and the original time CT, i.e., the calculation of the offset OS is conducted by the difference unit 13. However, this calculation may be conducted by the CPU connected to the same bus as the receiving device. Hereafter, this will be described in detail.

Figure 7:
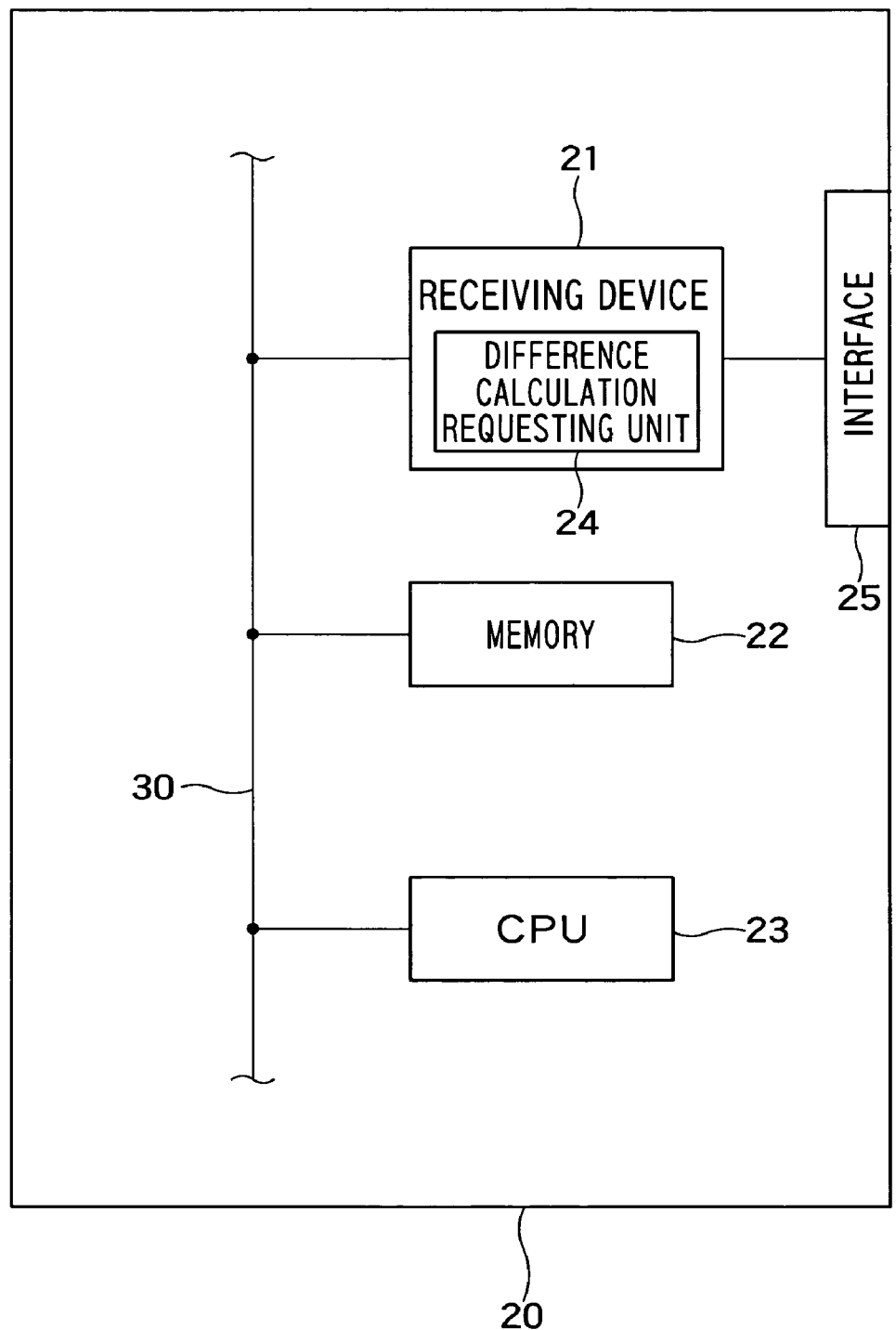
FIG. 7 is a block diagram showing a configuration of a time stamp correction system according to an embodiment of the present invention.

FIG. 7 is a block diagram showing a configuration of a time stamp correction system 20 according to an embodiment of the present invention.

A receiving device 21, a memory 22 and a CPU 23 are connected to the same bus 30. An interface 25 is connected to an IEEE1394 network. The receiving device 21 is equivalent to that shown in FIG. 1. However, the difference unit 13 is not included, and instead a difference calculation requesting unit 24 is included. Upon being supplied with the time stamp TS separated by the receiving filter 12 (see FIG. 1), the difference calculation requesting unit 24 sends the time stamp TS and the cycle time CT at this time to the CPU 23. The CPU 23 calculates a difference between the received time stamp TS and cycle time CT, and returns the difference data, i.e., the offset OS to the difference calculation requesting unit 24. The difference calculation requesting unit 24 passes the received offset OS to the adder 14 (see FIG. 1).

Here, the example in which the calculation of the offset OS is conducted by the CPU 23 has been shown. Besides, the processing of adding the original time OT and the offset OS and thereby generating the original time stamp OTS may also be conducted by the CPU. Hereafter, this will be described in detail.

Figure 8:
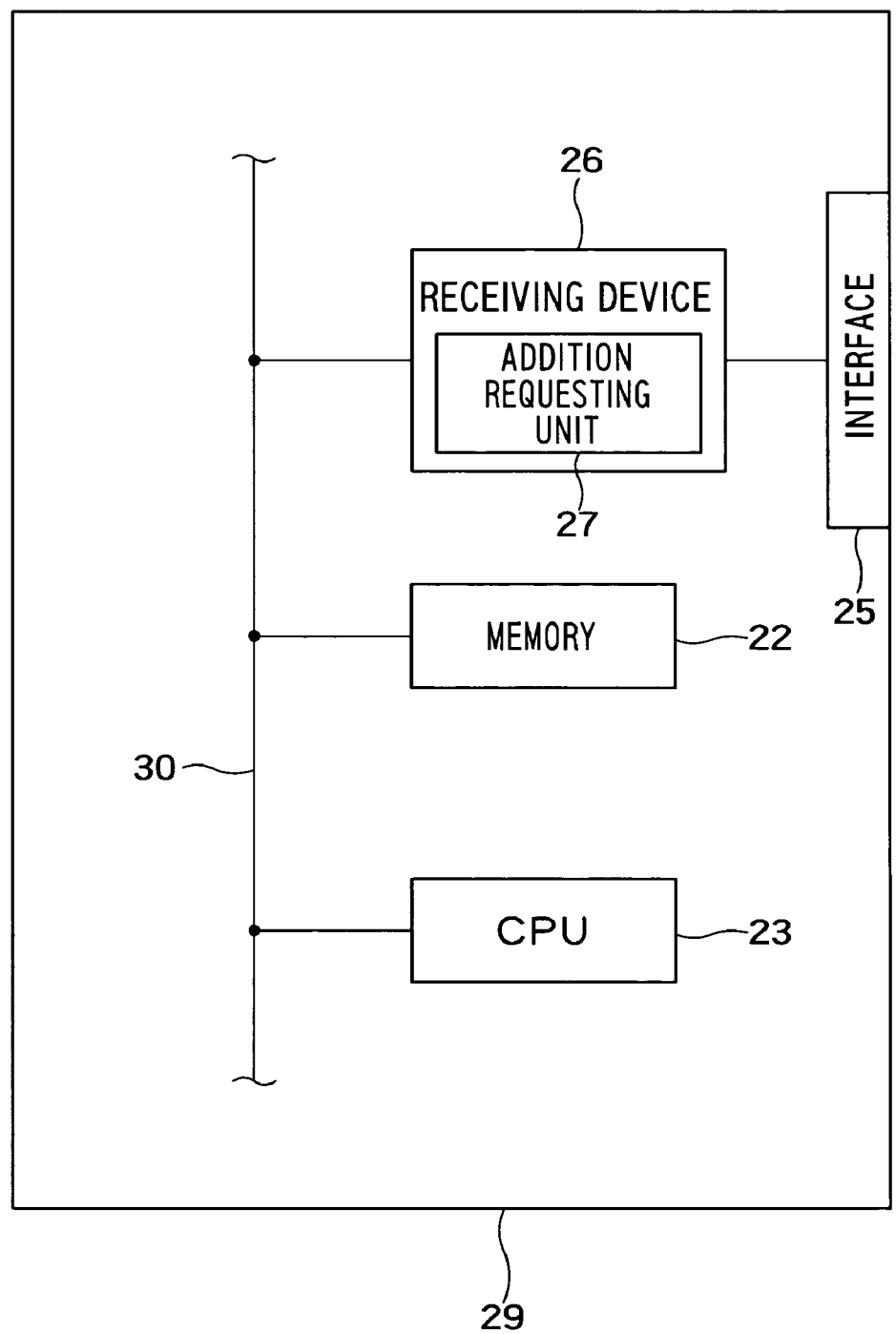
FIG. 8 is a block diagram showing a configuration of a time stamp correction system according to another embodiment of the present invention.

FIG. 8 is a block diagram showing a configuration of a time stamp correction system 29 according to another embodiment of the present invention.

As shown in FIG. 8, a receiving device 26 does not include the adder 14 (see FIG. 1). Instead, the receiving device 26 includes an addition requesting unit 27. Upon being supplied with the offset OS from the difference unit 13 (or the difference calculation requesting unit 24), the addition requesting unit 27 sends the offset OS and the original time OT (see FIG. 1) at this time to the CPU 23. The CPU 23 adds the received offset OS and the original time OT, thereby generates the original time stamp OTS, and returns the generated original time stamp OTS to the addition requesting unit 27. The addition requesting unit 27 passes the received original time stamp OTS to the data generating unit 16.

By making the CPU 23 execute the calculation of the offset OS and/or the generation of the original time stamp OTS as hereafter described, the circuit scale of the receiving device can be made small.

Figure 9:
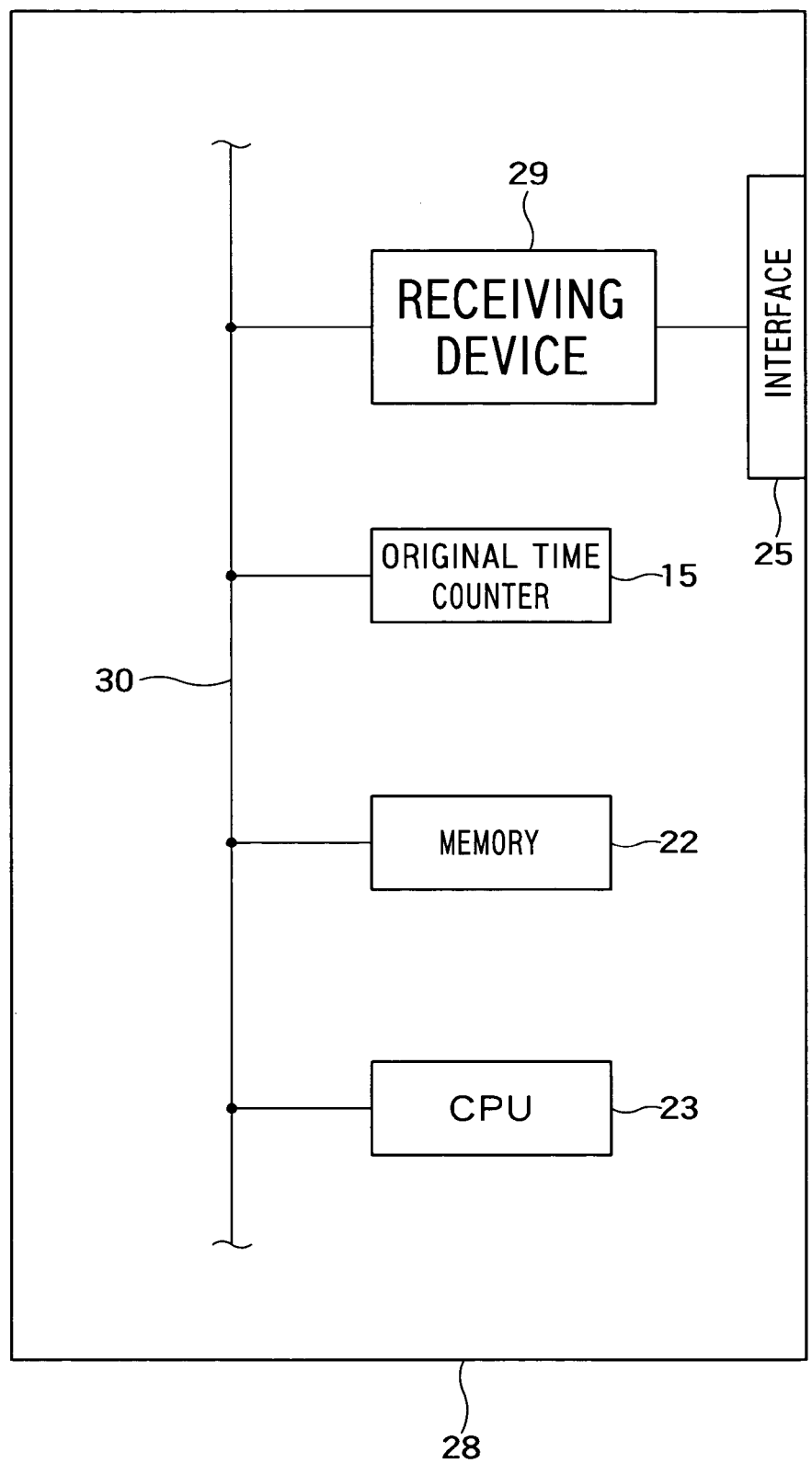
FIG. 9 is a block diagram showing a configuration of a time stamp correction system according to further another embodiment of the present invention.

FIG. 9 is a block diagram showing a configuration of a time stamp correction system 28 according to further another embodiment of the present invention.

In the embodiments described above, the original time counter 15 (see FIG. 1) is arranged within the receiving device. In the present embodiment, however, the original time counter 15 is arranged outside the receiving device.

A receiving device (first semiconductor substrate) 29, the original time counter (second semiconductor substrate) 15, the memory 22 and the CPU 23 are connected to the same bus 30. The receiving device 29 is equivalent to that shown in FIG. 1. However, the receiving device 29 does not include the original time counter 15. The adder 14 and the output control unit 18 (see FIG. 1) in the receiving device 29 conducts processing by successively acquiring the original time OT from the original time counter 15 connected to a bus 30.

By arranging the original time counter 15 outside the receiving device as described above, the circuit scale of the receiving device can be made small. In addition, it also becomes easy to share the original time counter 15 with other devices.

What is claimed is:

1. A time stamp correction apparatus which receives a packet including real time data and a time stamp, which is based on network time and to be added to the real time data from a network, and reproduces the real time data in the received packet on the basis of the time stamp, the time stamp correction apparatus comprising:
    a packet receiving unit which receives a first packet including the real time data and a first time stamp based on the network time from the network;
    a network time counter which successively generates the network time in accordance with network time synchronous information input from the network;
    a difference calculating unit supplied with the first time stamp included in the received first packet to calculate a difference between time indicated by the first time stamp and the network time;
    a local time counter which successively generates local time;
    a time stamp generating unit which generates a second time stamp on the basis of the difference and local time;
    a packet generating unit which generates a second packet by adding the second time stamp to the real time data;
    a buffer unit which stores the generated second packet; and
    an output control unit which conducts output control on the second packet in the buffer unit on the basis of the local time.

2. The time stamp correction apparatus according to claim 1, further comprising:
    a filter which extracts the real time data and the first time stamp from the first packet received by the packet receiving unit,
    wherein the filter outputs the extracted real time data to the packet generating unit, and outputs the extracted first time stamp to the difference calculating unit.

3. The time stamp correction apparatus according to claim 1, wherein the difference calculating unit calculates the difference by subtracting the network time from the time indicated by the first time stamp.

4. The time stamp correction apparatus according to claim 3, wherein the time stamp generating unit generates the second time stamp by adding the difference to the local time.

5. The time stamp correction apparatus according to claim 1, wherein the time stamp generating unit generates the second time stamp by adding the difference to the local time.

6. The time stamp correction apparatus according to claim 1, wherein in the case where the time indicated by the second time stamp in the second packet coincides with the local time, the output control unit outputs the second packet.

7. The time stamp correction apparatus according to claim 1, wherein the network is an IEEE 1394 network.

8. The time stamp correction apparatus according to claim 7, wherein the packet receiving unit receives the first packet under an isochronous transfer system.

9. The time stamp correction apparatus according to claim 8, wherein the network time synchronous information is a cycle start packet.

10. The time stamp correction apparatus according to claim 1, wherein the real time data is any one of image data and sound data.

11. The time stamp correction apparatus according to claim 1, wherein
    the packet receiving unit, the network time counter, the difference calculating unit, the time stamp generating unit, the packet generating unit, the buffer unit, and the output control unit are formed on a first semiconductor substrate,
    the local time counter is formed on a second semiconductor substrate different from the first semiconductor substrate, and
    the first and second semiconductor substrate are connected to an identical bus.

12. A time stamp correction system for being used in an apparatus which receives a packet including real time data and a time stamp, which is based on network time and to be added to the real time data from a network, and reproduces the real time data in the received packet on the basis of the time stamp, the time stamp correction system comprising:
    a time stamp correction apparatus comprising a packet receiving unit which receives a first packet including the real time data and a first time stamp based on the network time from the network, a network time counter which successively generates the network time in accordance with network time synchronous information input from the network, a local time counter which successively generates local time, and a difference requesting unit which requests calculation of a difference between the first time stamp in the first packet and the network time; and
    a CPU connected to an identical bus with the time correction apparatus to execute the difference calculation requested by the time stamp correction apparatus and output an execution result, wherein the time stamp correction apparatus further comprises:
a time stamp generating unit which receives the execution result from the CPU and generates a second time stamp on the basis of the received execution result and the local time;
a packet generating unit which generates a second packet by adding the second time stamp to the real time data;
a buffer unit which stores the generated second packet; and
an output control unit which conducts output control on the second packet in the buffer unit on the basis of the local time.

13. The time stamp correction system according to claim 12, further comprising:
a filter which extracts the real time data and the first time stamp from the first packet received by the packet receiving unit,
wherein the filter outputs the extracted real time data to the packet generating unit, and outputs the extracted first time stamp to the difference requesting unit.

14. The time stamp correction system according to claim 12, wherein the CPU calculates the difference by subtracting the network time from the time indicated by the first time stamp.

15. The time stamp correction system according to claim 14, wherein the time stamp generating unit generates the second time stamp by adding the difference to the local time.

16. A time stamp correction system for being used in an apparatus which receives a packet including real time data and a time stamp, which is based on network time and to be added to the real time data from a network, and reproduces the real time data in the received packet on the basis of the time stamp, the time stamp correction system comprising:
a time stamp correction apparatus comprising a packet receiving unit which receives a first packet including the real time data and a first time stamp based on the network time from the network, a network time counter which successively generates the network time in accordance with network time synchronous information input from the network, a local time counter which successively generates local time, a difference calculating unit supplied with the first time stamp included in the first packet to calculate a difference between the first time stamp and the network time, and a time stamp generation requesting unit which requests generation of a second time stamp based on the difference and the local time; and
a CPU connected to an identical bus with the time correction apparatus to generate the second time stamp with accordance with the request from the time stamp correction apparatus, and output the generated time stamp,
wherein the time stamp correction apparatus further comprises:
a packet generating unit which receives the second time stamp and generates a second packet by adding the real time data to the second time stamp;
a buffer unit which stores the generated second packet; and
an output control unit which conducts output control on the second packet in the buffer unit on the basis of the local time.

17. The time stamp correction system according to claim 16, further comprising:
a filter which extracts the real time data and the first time stamp from the first packet received by the packet receiving unit,
wherein the filter outputs the extracted real time data to the packet generating unit, and outputs the extracted first time stamp to the difference calculating unit.

18. The time stamp correction system according to claim 16, wherein the difference calculating unit calculates the difference by subtracting the network time from the time indicated by the first time stamp.

19. The time stamp correction system according to claim 18, wherein the CPU generates the second time stamp by adding the difference to the local time.

* * * * *